(12) United States Patent
Broager et al.

(10) Patent No.: US 10,564,028 B2
(45) Date of Patent: Feb. 18, 2020

(54) DISPERSION UNIT FOR A COMBINATION WEIGHER

(71) Applicant: MAREL A/S, Aarhus N (DK)

(72) Inventors: Anne Broager, Ega (DK); Michael Tjornelund, Randers NV (DK); Ole Kaastrup, Hinnerup (DK)

(73) Assignee: MAREL A/S, Aarhus N (DK)

(*) Notice: Subject to any disclaimer, the term of this patent is extended or adjusted under 35 U.S.C. 154(b) by 0 days.

(21) Appl. No.: 16/477,339

(22) PCT Filed: Jan. 12, 2018

(86) PCT No.: PCT/EP2018/050742
§ 371 (c)(1),
(2) Date: Jul. 11, 2019

(87) PCT Pub. No.: WO2018/130645
PCT Pub. Date: Jul. 19, 2018

(65) Prior Publication Data
US 2019/0376834 A1   Dec. 12, 2019

(30) Foreign Application Priority Data

Jan. 13, 2017 (DK) .................................. 2017 70024
Jul. 13, 2017 (EP) ..................................... 17181216

(51) Int. Cl.
*B65G 19/04* (2006.01)
*B65G 33/26* (2006.01)
(Continued)

(52) U.S. Cl.
CPC .............. *G01G 13/06* (2013.01); *B65G 19/04* (2013.01); *B65G 33/265* (2013.01); *G01G 13/026* (2013.01); *G01G 19/393* (2013.01)

(58) Field of Classification Search
CPC .... G01G 13/06; G01G 13/026; G01G 19/387; G01G 19/393; B65B 35/08; B65G 19/04; B65G 33/265; B65G 47/46
See application file for complete search history.

(56) References Cited

U.S. PATENT DOCUMENTS

| | | | | | |
|---|---|---|---|---|---|
| 4,662,508 | A | * | 5/1987 | Inoue ................... | G01G 19/393 |
| | | | | | 177/25.18 |
| 7,732,718 | B2 | * | 6/2010 | Tatsuoka .............. | G01G 19/393 |
| | | | | | 177/25.18 |

(Continued)

FOREIGN PATENT DOCUMENTS

| EP | 1698868 A1 | 9/2006 |
|---|---|---|
| EP | 2116823 A2 | 11/2009 |

(Continued)

OTHER PUBLICATIONS

Danish Search Report from DK Application No. 201770024, dated Jul. 4, 2017.

(Continued)

*Primary Examiner* — Randy W Gibson
(74) *Attorney, Agent, or Firm* — Workman Nydegger

(57) ABSTRACT

A combination weigher includes: a dispersion unit adapted to radially disperse food products dropped in from above and onto the dispersion unit; a plurality of V-shaped like guide structures extending radially away from a center of the dispersion unit and arranged such that a narrower end of the V-shaped like guide structures face a center point of the dispersion unit; a plurality of hoppers associated to each of the trenches arranged below the outfeed ends of the trenches; and a control unit; and screw feeders arranged in each of the trenches operated by the control unit. The space between adjacent V-shaped like guide structures at a distance R1 defines a buffer zone for radially dispersed food products from the dispersion unit. The screw feeders in the adjacent trenches have opposite orientation and rotate in opposite directions such that upper part of the screw feeders are rotating away from each other.

10 Claims, 3 Drawing Sheets

(51) Int. Cl.
  *G01G 19/393*  (2006.01)
  *G01G 13/06*  (2006.01)
  *G01G 13/02*  (2006.01)

(56) References Cited

U.S. PATENT DOCUMENTS

| | | | | |
|---|---|---|---|---|
| 8,188,383 | B2* | 5/2012 | Mikami | G01G 19/393 |
| | | | | 177/25.18 |
| 8,851,269 | B2* | 10/2014 | Hansen | B65B 5/08 |
| | | | | 198/563 |
| 2013/0186696 | A1* | 7/2013 | Broager | G01G 19/393 |
| | | | | 177/52 |

FOREIGN PATENT DOCUMENTS

| | | |
|---|---|---|
| EP | 2670669 B1 | 11/2014 |
| EP | 3112825 A1 | 1/2017 |
| JP | 2015118030 A | 6/2015 |
| WO | 2016117148 A1 | 3/2018 |

OTHER PUBLICATIONS

European Search Report from EP Application No. 17181216, dated Dec. 22, 2017.
International Search Report from PCT Application No. PCT/EP2018/050742, dated Mar. 8, 2018.

* cited by examiner

DISPERSION UNIT FOR A COMBINATION WEIGHER

FIELD OF THE INVENTION

The present invention relates to a combination weigher and to method of generating portion of food products by using such a combination weigher.

BACKGROUND OF THE INVENTION

Combination weighers are commonly used today in the food industry to generate portions of food products fulfilling a pre-defined weight targets. Such a combination weighers comprises a dispersion unit configured to receive food items from an infeed unit typically positioned above, a plurality of conveyance units that extend radially away from the dispersion units for receiving food items from the dispersion unit, and a plurality of weighing hoppers associated to each of the conveyance units for receiving food products therefrom. The weighing hoppers are operated by a control unit by repeatedly monitoring the weight in each of the weighing hopper for finding an optimal weight combination in two or more weighing hoppers such that a minimal overweight is obtained. Subsequently the food products are dropped from the selected two or more weighing hoppers into a common area, e.g. a bag, tray or the like.

Such a conveyance units typically consist of trenches and screw feeders arranged therein for advancing food products received from the dispersion units and radially away and into the associated weighing hoppers. However, if there is some size variation in the food products, some of the larger food products may not enter the trenches because their width may be larger than the width of the trenches, and more seriously these larger food products may block the access of other food products therein. This will obviously greatly affect the throughput of the machine, and also require a manual labor to stop the blocking. The most common solution to overcoming this problem is to widen the width of the trenches, but that will be at the cost of overall size of the combination weigher.

Another common problem with such a combination weighers is that food products in the trenches can be clamped between the screw feeders and the wall of the trenches and thus be damaged and or even stop the screw feeders.

SUMMARY OF THE INVENTION

On the above background it is an object of embodiments of the present invention to provide a combination weigher that is compact and is capable of generating portions of food products where larger size variation of the food products is tolerated, and where the throughput of the combination weigher may be increased.

In general, the invention preferably seeks to mitigate, alleviate or eliminate one or more of the above mentioned disadvantages of the prior art singly or in any combination. In particular, it may be seen as an object of embodiments of the present invention to provide a combination weigher that solves the above mentioned problems, or other problems.

To better address one or more of these concerns, in a first aspect of the invention a combination weigher is provided, comprising:
  a dispersion unit adapted to radially disperse food products dropped in from above and onto the dispersion unit,
  a plurality of V-shaped like guide structures extending radially away from a center of the dispersion unit and arranged such that a narrower end of the V-shaped like guide structures face a center point of the dispersion unit, and where the V-shaped like guide structures are designed such that for every second V-shaped like guide structure the distance R1 from the narrower end of the V-shaped like guide structure to the center point of the dispersion unit is smaller than the distance R2 from the narrower end of the remaining V-shaped like guide structures to the center of the dispersion unit, and where the sides of adjacent V-shaped like guide structures define side walls of trenches, where the trenches comprise circular sector shape bottom portions, where the trenches comprise receiving ends where the radially disperse food products are received from the dispersion unit and outfeed ends where the food products are released from the trenches,
  a plurality of hoppers associated to each of the trenches arranged below the outfeed ends of the trenches,
  a control unit, and
  screw feeders arranged in each of the trenches operated by the control unit, where the operation includes operate a rotational movement of the screw feeders and thus the conveying of the food products from the receiving ends of the trenches towards the outfeed ends of the trenches where they are released into the plurality of hoppers,
wherein the space between adjacent V-shaped like guide structures at a distance R1 defines a buffer zone for radially dispersed food products from the dispersion unit, and where the screw feeders in the adjacent trenches thereof have opposite orientation and rotate in opposite directions such that upper part of the screw feeders are rotating away from each other.

The buffer zone facilitates access of larger food products to the trenches because it acts as a bigger "door" for the food products from the dispersion unit, but these larger food products are food products that might otherwise not be able to be delivered to the trenches from the dispersion unit due to their size/shape and would simply block the access of other smaller food products to the trenches. This could as an example occur for food products such as chicken fillets or poultry meat on bones, e.g. chicken thighs, which would be considered to be too large for entering the trenches. However, the fact that such food products will be accumulated in the buffer zones will greatly facility the deliver of the food items into the trenches, and more importantly, the overall size of the apparatus may thus be kept minimal, since otherwise larger trenches would result in a larger combination weigher.

Also, the buffer zone acts as a buffer for accumulated food products meaning that in case of a temporal shortage of food products at the dispersion unit, e.g. due to temporal shortage from an infeed unit that may be positioned above the dispersion unit, these accumulated food products will ensure that the temporal shortage will not affect the throughput of the combination weigher.

Moreover, the fact that the screw feeders in the adjacent trenches have opposite orientation and rotate in opposite directions such that upper part of the screw feeders are rotating away from each other will prevent the food products from being clamped between the screw feeders and the trenches. Also, a shoveling of the food products is provided that will rearrange the orientation of the food products and facilitate the feeding of the food products from the receiving ends of the trenches towards the outfeed ends of the trenches.

In one embodiment, the distances R1 are identical and constant, and where the distances R2 are identical and constant.

In one embodiment, the buffer zone comprises an upwardly extending hill-like structure comprising a ridge having a height being less than the height of the adjacent V-shaped like guide structures. In an embodiment, the upwardly extending hill-like structure extends from the distance R2 radially towards the center point of the center cone up to at least the radial distance R1, where preferably the ridge is highest at the distance R2 and does not exceed the diameter of the screw feeders (or is less), and where the height preferably gradually decreases towards the center point of the center cone. Accordingly, it is prevented that a kind of a "dead zone" is formed at the center of the buffer zone in said area between the inlet end of the adjacent V-shaped like guide structures. Moreover, due to the hill-like structure, and in particularly the incline shape of it, it is ensured via the opposite rotational direction, that food products at the buffer zone will be shoveled over it and be partly re-orientated which will facilitate the optimal physical interaction between the screw feeders and the food products. This means that relative large food products, e.g. an oblong food item such as chicken thigh, will be optimally re-orientated such that the advancing through the throughts and into the associated hopper will be possible.

In one embodiment, the dispersion unit comprises a center cone operated by a driving unit configured to move the center cone along a vertical rotational axis. This driving may be adapted to the type of food products, and may e.g. include back and forth rotation.

In one embodiment, the plurality of hoppers comprise weighing hopper and where the control unit is configured to repeatedly monitoring the weight in each of the weighing hopper for finding an optimal weight combination in two or more weighing hoppers such that a minimal overweight is obtained, and subsequently dropping the food products in the selected two or more weighing hoppers into a common area. Such weighing hoppers which are well known to a person skilled in the art may e.g. comprise one or more upper buffer compartments for accumulating food products, preferably one at a time, and where said controlling may further comprise a controlled releasing of the food products from the at least one buffer compartment and into the "weighing compartment" of the weighing hopper where the weight is registered and used to find an optimal weight combination such that the overweight will be minimized.

In one embodiment, the screw feeders extend partly out from the outfeed ends of the trenches. This may e.g. correspond to a length close to an average size of the food products and facilitates the releasing of certain amount of food products from the trenches and into the associated hoppers and minimizes the risk that additional products slide from the trenches and into the associated hoppers.

In one embodiment, the screw feeders are made of a material being softer than the material of the trenches, where the radius of the sector shape bottom portions is essentially the same or larger as the outer radius of the screw feeders, and where the cross-sectional shape of the screw feeders is a polygon having three or more edges. As an example, if the trenches are made of steel or steel alloy, a preferred material of the screw feeders might be plastic material. Moreover, by have such a cross sectional shape of the screw feeders, e.g. a rectangular cross section, a scraping effect is provided between the screw feeders and the material, which will fully avoid that the food products become clamped between the screw feeders and the trenches. In one embodiment, the cross sectional shape of the material forming the winding of the screw feeder may include at least two non-parallel sides. For example, the cross-sectional shape may include two parallel and two non-parallel sides. The cross section may e.g. be trapezoid. The provision of non-parallel sides may contribute to efficiently pushing food products in the forward direction and inwardly, i.e. towards a center axis of the screw feeder.

In general, the screw feeders may be made from a non-metallic material, such as, e.g., plastics, notably food-grade plastic material, plastic composites, or rubber, including natural and synthetic rubber, such as a polymerized rubber. The plastics material may in one embodiment be a thermoplastic material. In another embodiment, it may be a thermosetting material.

The screw feeders may thus, for example, be made from nylon, acrylics, polyvinyl chloride (PVC), unplasticised polyvinyl chloride (uPVC), polyethylene (PE), including high-density polyethylene (HDPE) or low-density polyethylen (LDPE), polypropylene (PP), or polycarbonate. Not all screw feeders need to be made from the same material; different materials may be used for different screw feeders in one embodiment of the invention. The screw feeders may be made from mixes of different plastics materials, such as mixes of plastics and rubber, or mixes of different plastics materials.

With a view to achieving flexibility and/or avoiding abrasion, or dust formation, caused by contact between the screw feeders and the trenches, the screw feeders may preferably be made from a material having a Young's modulus, defined as the relationship between stress (force per unit area) and strain (proportional deformation) in the material, of below 100 Gpa, such as below 75 GPa, such as below 50 GPa, such as below 40 GPa, such as below 30 GPa, such as below 20 GPa, such as below 10 GPa, such as below 5 GPa, such as in the range between 0.001 and 10 GPa, such as in the range between 0.001 and 5 GPa. The aforementioned values of Young's modulus are at room temperature, i.e. 20° C.

With a view to avoiding abrasion or dust formation caused by contact between the screw feeder and the trenches, the screw feeder may preferably have a shore A hardness of less than 95, such as less than 90, such as less than 80, or between 30 and 90, such as between 40 and 90, or between 30 and 90, or between 40 and 80.

In preferred embodiments of the invention, the screw feeder is made from a plastics material, most preferably a thermoplastic material, and has a Young's modulus in the range between 0.001 and 10 GPA, and a shore A hardness of between 30 and 80.

The screw feeders are preferably configured to be able to restore their original shape after deformation or temperature changes, notably such as to be able to return to their original axial orientation after deformation. For example, the screw feeders may be made from a shape-memory polymer.

With a view to avoiding abrasion or dust formation caused by contact between the screw feeder and the trenches, the screw feeder may preferably have a shore A hardness of less than 95, such as less than 90, such as less than 80, or between 30 and 90, such as between 40 and 90, or between 30 and 90, or between 40 and 80.

In preferred embodiments of the invention, the screw feeder is made from a plastics material, most preferably a thermoplastic material, and has a Young's modulus in the range between 0.001 and 10 GPA, and a shore A hardness of between 30 and 80.

In a second aspect of the invention, a method is provided for generating portions of food products using a combination weigher which comprises:

a dispersion unit adapted to radially disperse food products dropped in from above and onto the dispersion unit, a plurality of V-shaped like guide structures extending radially away from a center of the dispersion unit and arranged such that a narrower end of the V-shaped like guide structures face a center point of the dispersion unit, and where the V-shaped like guide structures are designed such that for every second V-shaped like guide structure the distance R1 from the narrower end of the V-shaped like guide structure to the center point of the dispersion unit is smaller than the distance R2 from the narrower end of the remaining V-shaped like guide structures to the center of the dispersion unit, and where the sides of adjacent V-shaped like guide structures define side walls of trenches, where the trenches comprise circular sector shape bottom portions where the trenches comprise receiving ends where the radially disperse food products are received from the dispersion unit and outfeed ends where the food products are released from the trenches, a plurality of hoppers associated to each of the trenches arranged below the outfeed ends of the trenches, a control unit, and screw feeders arranged in each of the trenches operated by the control unit, where the operation includes operate a rotational movement of the screw feeders and thus the conveying of the food products from the receiving ends of the trenches towards the outfeed ends of the trenches where they are released into the plurality of hoppers, wherein the space between adjacent V-shaped like guide structures at a distance R1 defines a buffer zone for radially dispersed food products from the dispersion unit, and where the screw feeders in the adjacent trenches thereof have opposite orientation and rotate in opposite directions such that upper part of the screw feeders are rotating away from each other.

BRIEF DESCRIPTION OF THE DRAWINGS

Embodiments of the invention will be described, by way of example only, with reference to the drawings, in which.

DESCRIPTION OF EMBODIMENTS

Figure 1:
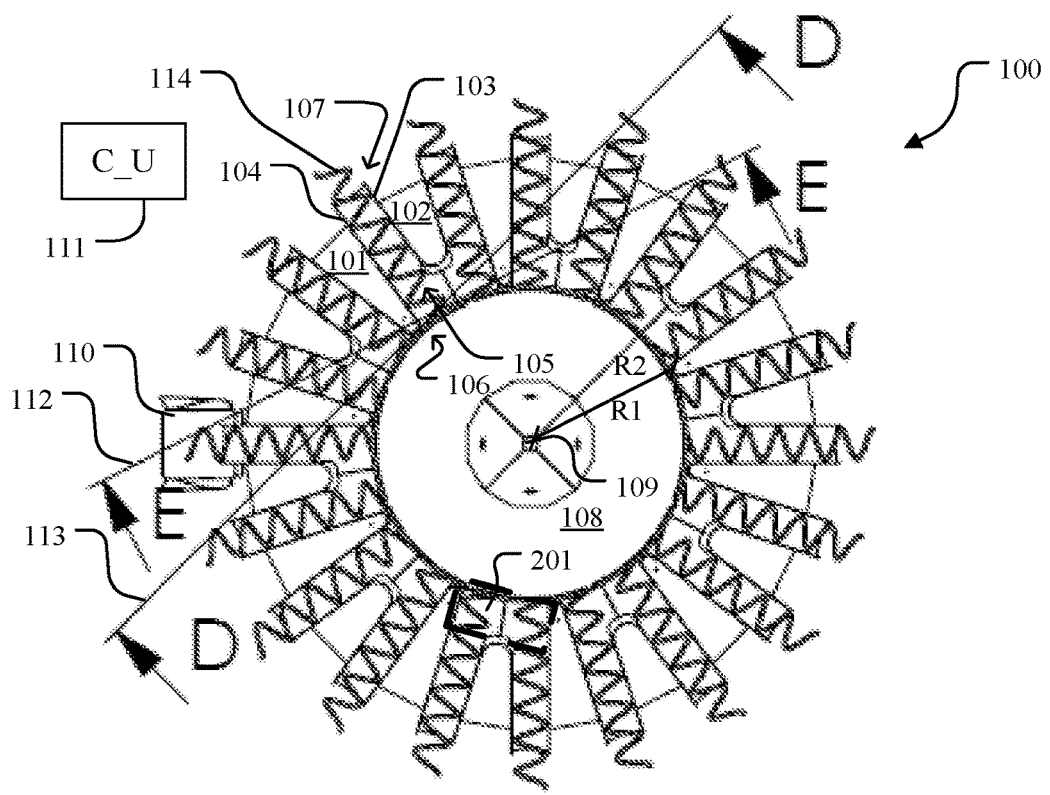
FIG. 1 shows a top view of one embodiment of a combination weigher according to the present invention.

FIG. 1 shows a top view of one embodiment of a combination weigher 100 according to the present invention. The combination weigher comprises a dispersion unit 108 adapted to radially disperse food products via rotational movement around axis 109, preferably back and forth rotational movement, where the food products are dropped in from above from an infeed unit (not shown) and onto the dispersion unit.

The combination weigher further comprises a plurality of V-shaped like guide structures 101,102 extending radially away from a center 109 of the dispersion unit 108. The V-shaped like structures, which may also be understood as essentially U-shaped like structures, are arranged such that the narrower ends thereof face a center point of the dispersion unit 108. The V-shaped like guide structures 101, 102 are further designed such that for every second V-shaped like guide structure the distance R1 from the narrower end of the V-shaped like guide structure to the center point of the dispersion unit is and is smaller than the distance R2 from the narrower end of the remaining V-shaped like guide structures to the center of the dispersion unit. As shown here, the distances R1 are identical and constant, and the distances R2 are identical and constant. The sides 103, 104 of adjacent V-shaped like guide structures define sides trenches 105, where the trenches comprise circular sector shape bottom portions, and have receiving ends 106 where the radially disperse food products are received from the dispersion unit, and outfeed ends 107 where the food products are released from the trenches.

The combination weigher 100 further comprises screw feeders 114 arranged in each of the trenches 105 operated by a control unit 111. Each of the trenches 105 is associated with hoppers 110 (to simplify the drawing, only one hopper is shown), where the hoppers are arranged below the outfeed ends 107 of the trenches 105. The operation of the screw feeders 114 includes operating a fully controlled rotational movement of the screw feeders in discrete steps, where the rotational movement results in the conveying of the food products from the receiving ends 106 of the trenches towards the outfeed ends 107 of the trenches where they are released into the plurality of hoppers 110, preferably such that one food products falls from the trenches and into the hoppers at a time.

Figures 2, 3:
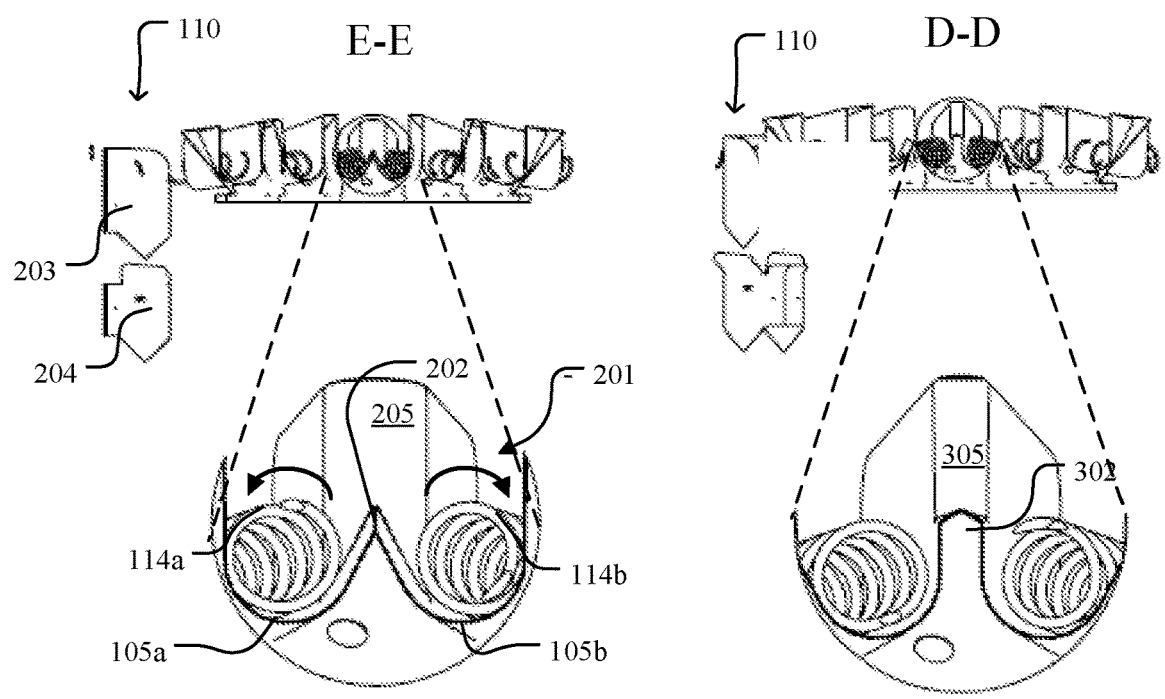
FIGS. 2 and 3 show a cross sectional view D-D and E-E in FIG. 1.

FIG. 2 shows a cross sectional view E-E 112 in FIG. 1 and the zoomed up view depicts the space 201 between adjacent V-shaped like guide structures at a distance R1, where the space 201 defines a buffer zone (see also in FIG. 1) for the radially dispersed food products from the dispersion unit 108. Moreover, as shown, the screw feeders in the adjacent trenches thereof have opposite orientation and are configured to rotate in opposite directions as indicated by the arrows such that upper part of the screw feeders are rotating away from each other. For further clarification, the upwardly extending portion 205 is the front portion of the narrow end of the V-shaped like guide structure 102 shown in FIG. 1.

As shown, the buffer zone 201 comprises an upwardly extending hill-like structure comprising a ridge 202, where the hill-like structure extends from the distance R2 radially towards the center point of the center cone up to at least the radial distance R1. Due to this structure in the buffer zone it is prevented that a kind of a "dead zone" is formed and more importantly it is ensured, via the opposite rotational direction of the screw feeders 105a,b, that the food products at the buffer zone will be shoveled over the ridge 202 causing the food products to fall to either of the sides and be partly re-orientated which will facilitate the optimal physical interaction between the screw feeders and the food products. This means that relative large food products, e.g. an oblong food item such as chicken thigh, will be optimally re-orientated such that the advancing through the troughs and into the associated hopper will be possible.

The plurality of hoppers 110 may in the embodiment shown here comprise a buffer compartment 203 where one or more food products are accumulated together, and a weighing hopper 204 or weighing compartment positioned below, and where the control unit is configured to repeatedly monitoring the weight in each of the weighing hopper for finding an optimal weight combination in two or more weighing hoppers such that a minimal overweight is obtained, and subsequently dropping the food products in the selected two or more weighing hoppers into a common area. When the food products have been released from the weighing hopper 204, the food products in the buffer compartment 203 is released into the weighing hopper 204 where the new weight if monitored and used by the control unit as new weighing data.

FIG. 3 depicts for comparison the cross sectional view D-D 113 which shows the "wall" section 302 between two adjacent buffer zones which prevents the food products to move from one buffer zone to the next. For further clarification, the upwardly extending portion 305 is the front portion of the narrow end of the V-shaped like guide structure 101 shown in FIG. 1.

Figure 4:
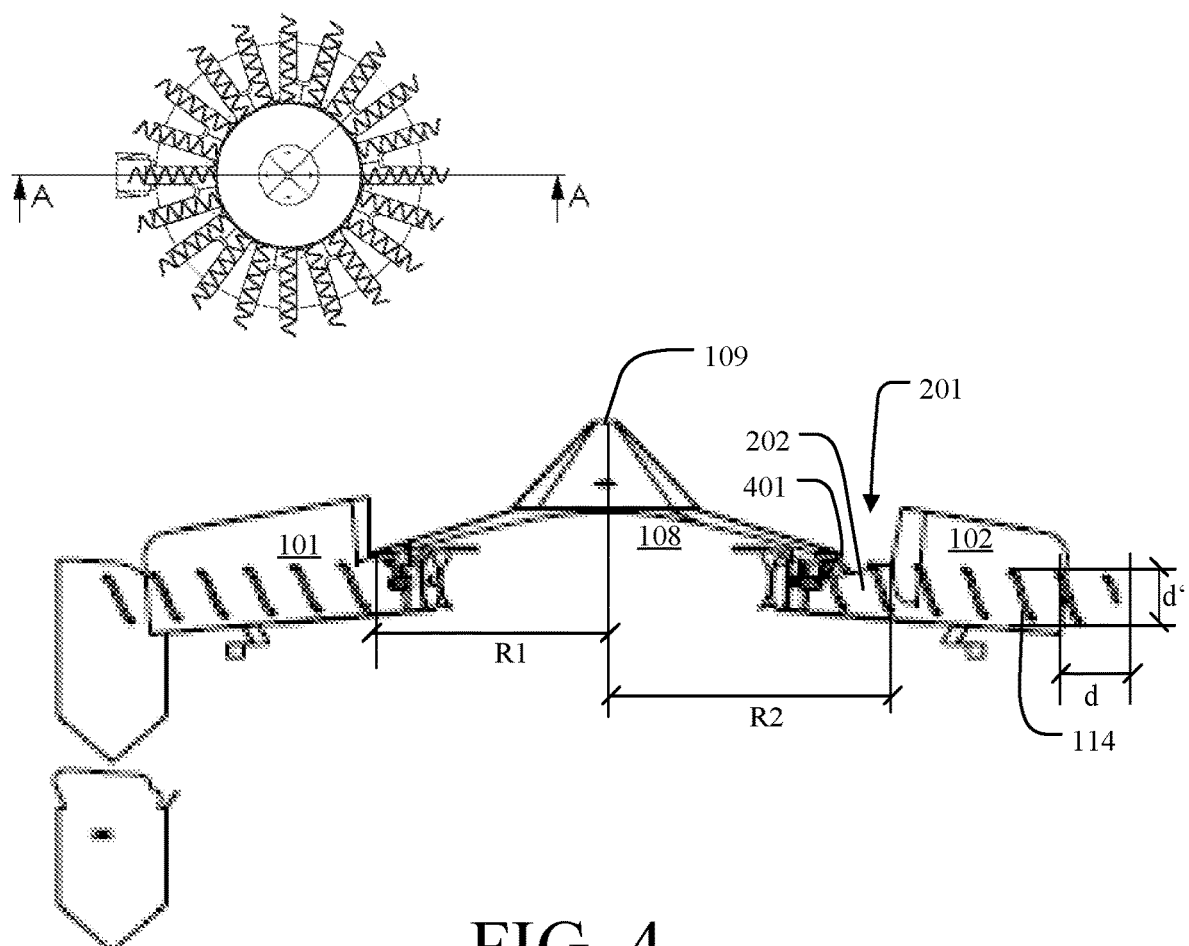
FIG. 4 depicts the cross section view A-A of FIG. 1.

FIG. 4 depicts the cross section view A-A of FIG. 1, showing in more detailed way the buffer zone 201 and the design of the hill-like structure 202 and the ridge, which as shown here has a height h2 at a distance R2, where h2 is less than the height of the adjacent V-shaped like guide structures, but close, or preferably somewhat less, to the diameter d' of the screw feeder 114. Also, the upwardly extending hill-like structure 202 extends from the distance R2 and partly below the periphery 401 of the dispersion unit 108, and where the height of the h2 gradually decreases such that the side view becomes incline towards the center point 109. This shape/design of the hill like structure prevents any kind of a "dead zone" at the center of the buffer zone, and also ensures, via the opposite rotational direction of the screw feeders 114*a,b*, that food products at the buffer zone will be shoveled over it and fall to either sides of the ridge and be partly re-orientated so as to facilitate the optimal physical interaction between the screw feeders and the food products.

In the embodiment shown here, the screw feeder 114 extend partly out from the outfeed ends of the trenches, or by a distance d, where this length may correspond to a length close to an average size of the food products. This facilitates the releasing of a certain amount of food products from the trenches and into the associated hoppers and thus minimizes the risk that additional products slide from the trenches and into the associated hoppers.

Figure 5:
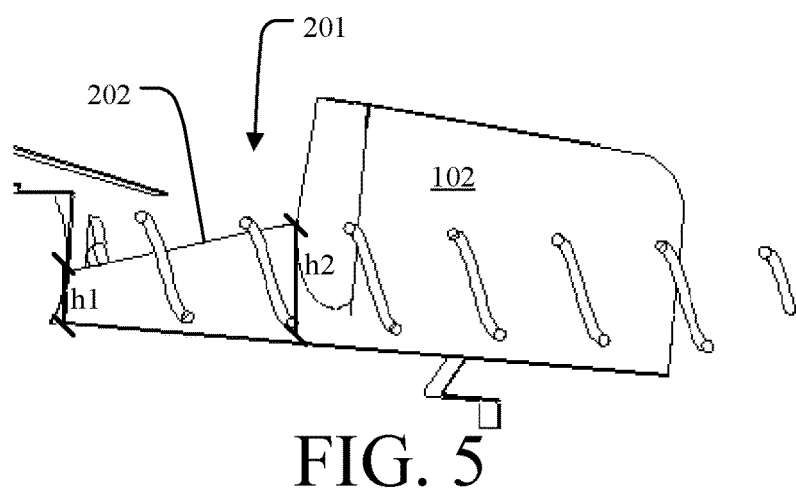
FIG. 5 shows a zoomed up view of FIG. 4, and FIGS. 6 and 7 depict one embodiment of a screw feeder to be used in relation to FIGS. 1 to 4.

FIG. 5 shows a zoomed up view of the buffer zone 201 and the ridge 202 of the upwardly extending hill-like structure comprising. Shown is also in more details how the height of the ridge gradually decreases from h2 towards the h1.

Figure 6:
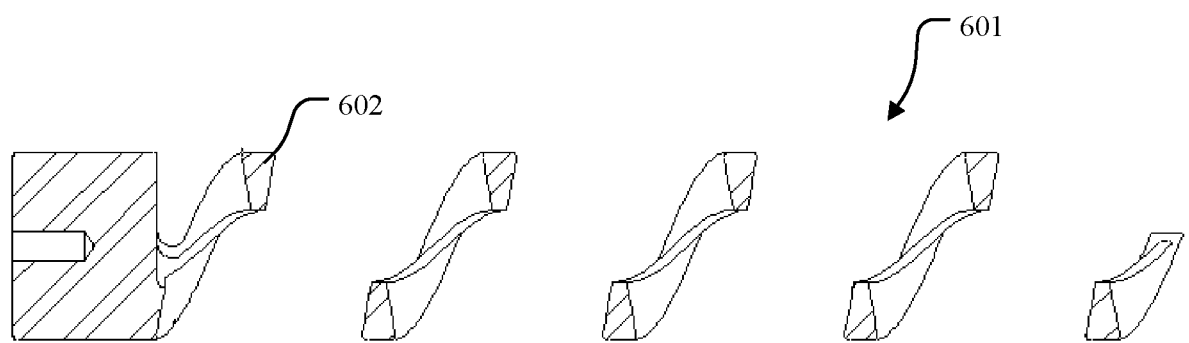
Figure 7:
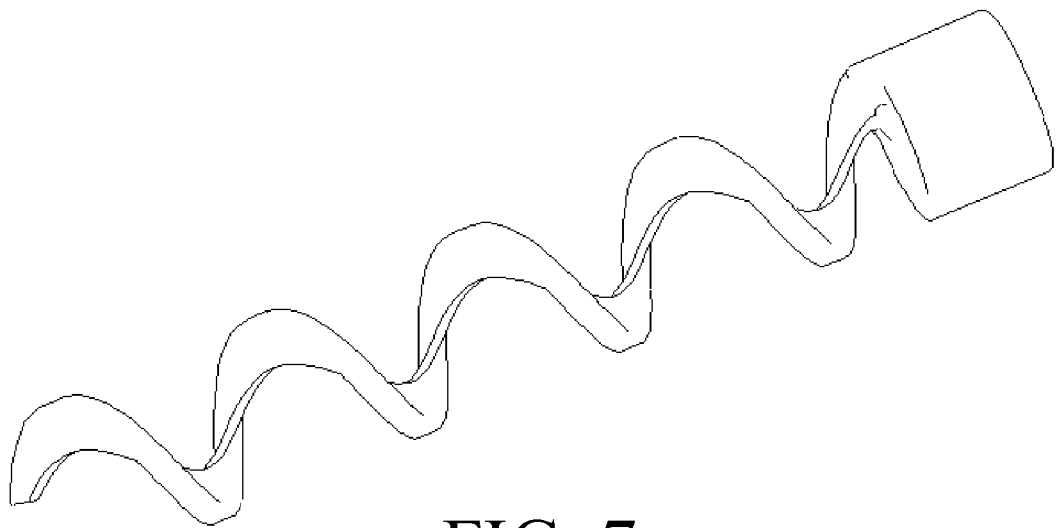

FIGS. 6 and 7 depict one embodiment of a screw feeder 601 to be used in relation to FIGS. 1 to 5, where the screw feeder is made of a material being softer than the material of the trenches, and where the radius of the sector shape bottom portions is essentially the same or larger than the outer radius of the screw feeders. More importantly, the cross-sectional shape 602 of the screw feeders is a polygon having three or more edges, or as shown here has four edges. As shown, the cross-sectional shape includes two parallel and two non-parallel sides in the shape of a trapezoid to contribute to efficiently pushing food products in the forward direction and inwardly, i.e. towards a center axis of the screw feeder. As an example, if the trenches are made of steel or steel alloy, a preferred material of the screw feeders might be plastic material. Moreover, by have such a cross sectional shape of the screw feeders, e.g. a rectangular cross section, a scraping effect is provided between the screw feeders and the food products, which will fully avoid that the food products become clamped between the screw feeders and the trenches.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A combination weigher, comprising:
a dispersion unit adapted to radially disperse food products dropped in from above and onto the dispersion unit,
a plurality of V-shaped like guide structures extending radially away from a center of the dispersion unit and arranged such that a narrower end of the V-shaped like guide structures face a center point of the dispersion unit, and where the V-shaped like guide structures are designed such that for every second V-shaped like guide structure the distance R1 from the narrower end of the V-shaped like guide structure to the center point of the dispersion unit is smaller than the distance R2 from the narrower end of the remaining V-shaped like guide structures to the center of the dispersion unit, and where the sides of adjacent V-shaped like guide structures define side walls of trenches, where the trenches comprise circular sector shape bottom portions, where the trenches comprise receiving ends where the radially disperse food products are received from the dispersion unit and outfeed ends where the food products are released from the trenches,
a plurality of hoppers associated to each of the trenches arranged below the outfeed ends of the trenches,
a control unit, and
screw feeders arranged in each of the trenches operated by the control unit, where the operation includes operate a rotational movement of the screw feeders and thus the conveying of the food products from the receiving ends of the trenches towards the outfeed ends of the trenches where they are released into the plurality of hoppers, wherein the space between adjacent V-shaped like guide structures at a distance R1 defines a buffer zone for radially dispersed food products from the dispersion unit, and where the screw feeders in the adjacent trenches thereof have opposite orientation and rotate in opposite directions such that upper part of the screw feeders are rotating away from each other.

2. The combination weigher according to claim 1, wherein the distances R1 are identical and constant, and where the distances R2 are identical and constant.

3. The combination weigher according to claim 1, wherein the buffer zone comprises an upwardly extending hill-like structure comprising a ridge having a height being less than the height of the adjacent V-shaped like guide structures.

4. The combination weigher according to claim 3, wherein the upwardly extending hill-like structure extends from the distance R2 radially towards the center point of the center cone up to at least the radial distance R1.

5. The combination weigher according to claim 3, wherein the ridge is highest at the distance R2 and where the height gradually decreases towards the center point of the center cone.

6. The combination weigher according to claim 5, wherein the height of the ridge at the distance R2 is essentially the same, or less, than the diameter of the screw feeders.

7. The combination weigher according to claim 3, wherein the dispersion unit comprises a center cone operated by a driving unit configured to move the center cone along a vertical rotational axis.

8. The combination weigher according to claim 1, wherein the plurality of hoppers comprise weighing hopper and where the control unit is configured to repeatedly monitoring the weight in each of the weighing hopper for finding an optimal weight combination in two or more weighing hoppers such that a minimal overweight is obtained, and subsequently dropping the food products in the selected two or more weighing hoppers into a common area.

9. The combination weigher according to claim 1, wherein the screw feeders extend partly out from the outfeed ends of the trenches.

10. A method of generating portions of food products using a combination weigher which comprises:
 a dispersion unit adapted to radially disperse food products dropped in from above and onto the dispersion unit,
 a plurality of V-shaped like guide structures extending radially away from a center of the dispersion unit and arranged such that a narrower end of the V-shaped like guide structures face a center point of the dispersion unit, and where the V-shaped like guide structures are designed such that for every second V-shaped like guide structure the distance R1 from the narrower end of the V-shaped like guide structure to the center point of the dispersion unit is smaller than the distance R2 from the narrower end of the remaining V-shaped like guide structures to the center of the dispersion unit, and where the sides of adjacent V-shaped like guide structures define side walls of trenches, where the trenches comprise circular sector shape bottom portions, where the trenches comprise receiving ends where the radially disperse food products are received from the dispersion unit and outfeed ends where the food products are released from the trenches,
 a plurality of hoppers associated to each of the trenches arranged below the outfeed ends of the trenches,
 a control unit, and
 screw feeders arranged in each of the trenches operated by the control unit, where the operation includes operate a rotational movement of the screw feeders and thus the conveying of the food products from the receiving ends of the trenches towards the outfeed ends of the trenches where they are released into the plurality of hoppers, wherein the space between adjacent V-shaped like guide structures at a distance R1 defines a buffer zone for radially dispersed food products from the dispersion unit, and where the screw feeders in the adjacent trenches thereof have opposite orientation and rotate in opposite directions such that upper part of the screw feeders are rotating away from each other.

* * * * *